US012810291B2

(12) United States Patent
Tian et al.

(10) Patent No.: US 12,810,291 B2
(45) **Date of Patent: *Nov. 24, 2026**

(54) EXPEDITED VIRTUAL CURRENCY TRANSACTION SYSTEM

(71) Applicant: PayPal, Inc., San Jose, CA (US)

(72) Inventors: Cheng Tian, San Jose, CA (US); Sandy Lynn Godsey, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,666

(22) Filed: Jan. 17, 2025

(65) Prior Publication Data

US 2025/0165964 A1 May 22, 2025

Related U.S. Application Data

(63) Continuation of application No. 18/151,371, filed on Jan. 6, 2023, now Pat. No. 12,243,053, which is a
(Continued)

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *G06Q 20/36* (2013.01); *G06Q 20/3674* (2013.01); *G06Q 20/401* (2013.01)

(58) Field of Classification Search
None
See application file for complete search history.

(56) References Cited

U.S. PATENT DOCUMENTS 8,229,859 B2 7/2012 Samid
10,262,321 B1 * 4/2019 Ramanathan ...... G06Q 20/3829
(Continued)

FOREIGN PATENT DOCUMENTS

JP 2020177702 A1 10/2020
WO 2012166790 A1 12/2012
WO WO-2014040717 A1 * 3/2014 ......... G06Q 20/3678

OTHER PUBLICATIONS

Strasser, G. H., "Digital Money", University of Southern California, Aug. 1998. (Year: 1998).*
(Continued)

*Primary Examiner* — Clay C Lee
(74) *Attorney, Agent, or Firm* — Haynes and Boone, LLP

(57) ABSTRACT

Expedited virtual currency transactions are provided by identifying a first user primary wallet associated with a virtual currency and including a first user primary wallet private key. First user secondary wallets are created that each include a respective first user secondary wallet private key, and a respective virtual currency transaction is performed using the first user primary wallet private key to transfer predefined amounts of the virtual currency from the first user primary wallet to each of the first user secondary wallets such that first user secondary wallets are provided with different predefined amounts of the virtual currency. Subsequently, an instruction is received to transfer a payment amount to a second user, and the second user is allocated a subset of the first user secondary wallet private keys included in respective first user secondary wallets that are associated with predefined amounts of the virtual currency that equal the payment amount.

20 Claims, 9 Drawing Sheets

Related U.S. Application Data continuation of application No. 15/251,464, filed on Aug. 30, 2016, now Pat. No. 11,551,207.

(51) Int. Cl.
*G06Q 20/36* (2012.01)
*G06Q 20/40* (2012.01)

(56) References Cited

U.S. PATENT DOCUMENTS

| | | | | |
|---|---|---|---|---|
| 2007/0179883 | A1* | 8/2007 | Questembert | G06Q 20/10 705/39 |
| 2014/0195326 | A1 | 7/2014 | Men et al. | |
| 2015/0046246 | A1 | 2/2015 | Men et al. | |
| 2015/0046337 | A1 | 2/2015 | Hu et al. | |
| 2015/0081566 | A1 | 3/2015 | Slepinin | |
| 2015/0170112 | A1* | 6/2015 | DeCastro | G06Q 20/367 705/39 |
| 2015/0170138 | A1 | 6/2015 | Rao | |
| 2015/0262176 | A1 | 9/2015 | Langschaedel et al. | |
| 2015/0356524 | A1 | 12/2015 | Pennanen | |
| 2015/0356555 | A1 | 12/2015 | Pennanen | |
| 2015/0363778 | A1 | 12/2015 | Ronca et al. | |
| 2016/0162873 | A1 | 6/2016 | Zhou et al. | |
| 2016/0212109 | A1 | 7/2016 | Hird | |
| 2019/0303887 | A1 | 10/2019 | Wright et al. | |

OTHER PUBLICATIONS

European Appl. No. 17847410.2, Extended European Search Report mailed Mar. 30, 2020, 9 pages.
European Application No. 17847410.2, Communication Pursuant to Article 94(3) EPC mailed on Nov. 26, 2021, 8 pages.
Harwick C., “Cryptocurrency and the Problem of Intermediation,” The Independent Review, 2016, vol. 20, No. 4, pp. 569-588.
International Appl. No. PCT/US2017/049216, International Search Report and Written Opinion dated Nov. 20, 2017, 10 pages.
International Preliminary Report on Patentability for Application No. PCT/US2017/049216 mailed on Mar. 14, 2019, 10 pages.
Strasser, G. H., “Digital money”, University of Southern California, ProQuest Dissertations & Theses. (1998) (Year: 1998).

* cited by examiner

EXPEDITED VIRTUAL CURRENCY TRANSACTION SYSTEM

CROSS REFERENCE TO RELATED APPLICATIONS

The present application is a Continuation of U.S. patent application Ser. No. 18/151,371, filed Jan. 5, 2023, which is a Continuation of U.S. patent application Ser. No. 15/251,464, filed Aug. 30, 2016, the contents of which are hereby incorporated by reference in their entirety.

BACKGROUND

Field of the Disclosure

The present disclosure generally relates to virtual currency processing, and more particularly to using private keys to improve processing an virtual currency transaction systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Some online and/or mobile transactions are now taking place using virtual currencies. Virtual currency systems provide unregulated, digital money that may be issued and controlled by distributed software created by the virtual currency developer of that virtual currency, rather than by central banks or public authorities that conventionally issue and control “real” currencies. For example, Bitcoin is a type of decentralized virtual currency that provides for peer-to-peer transactions without an intermediary, with those peer-to-peer transactions verified by Bitcoin network nodes and recorded in a public distributed ledger called a blockchain. Virtual currencies like Bitcoin have revolutionized money transfer and payment technology by allowing for inexpensive peer-to-peer transfer of value between users.

However, the decentralized nature of such virtual currencies is accompanied by a need to confirm transactions, and those confirmation processes introduce a time delay or latency period between the initialization of the transaction and the point at which the transaction has been confirmed. For example, Bitcoin transactions that are broadcast to the Bitcoin network nodes (i.e., when a payer provides an instruction to their virtual currency wallet to send Bitcoins to a payee) are subject to a “mining” process performed by the Bitcoin network nodes that ensures that the Bitcoins being sent in the Bitcoin transaction have not previously been transferred by the payer to another user, where the mining process can take approximately 10 minutes or more. In order to be sure that the Bitcoin transaction will ultimately result in a transfer of Bitcoins to the payee, the payee must wait until the mining process confirms the transaction before transferring goods and/or services to the payer. In many transaction situations, a 10 minute wait time will be too long for payers and/or payees, and those payers and/or payees will instead choose to perform the transaction using traditional payment methods rather than virtual currency. Issues like this have slowed the adoption of virtual currencies despite their advantages.

Thus, there is a need for an expedited virtual currency transaction system.

Figure 1:
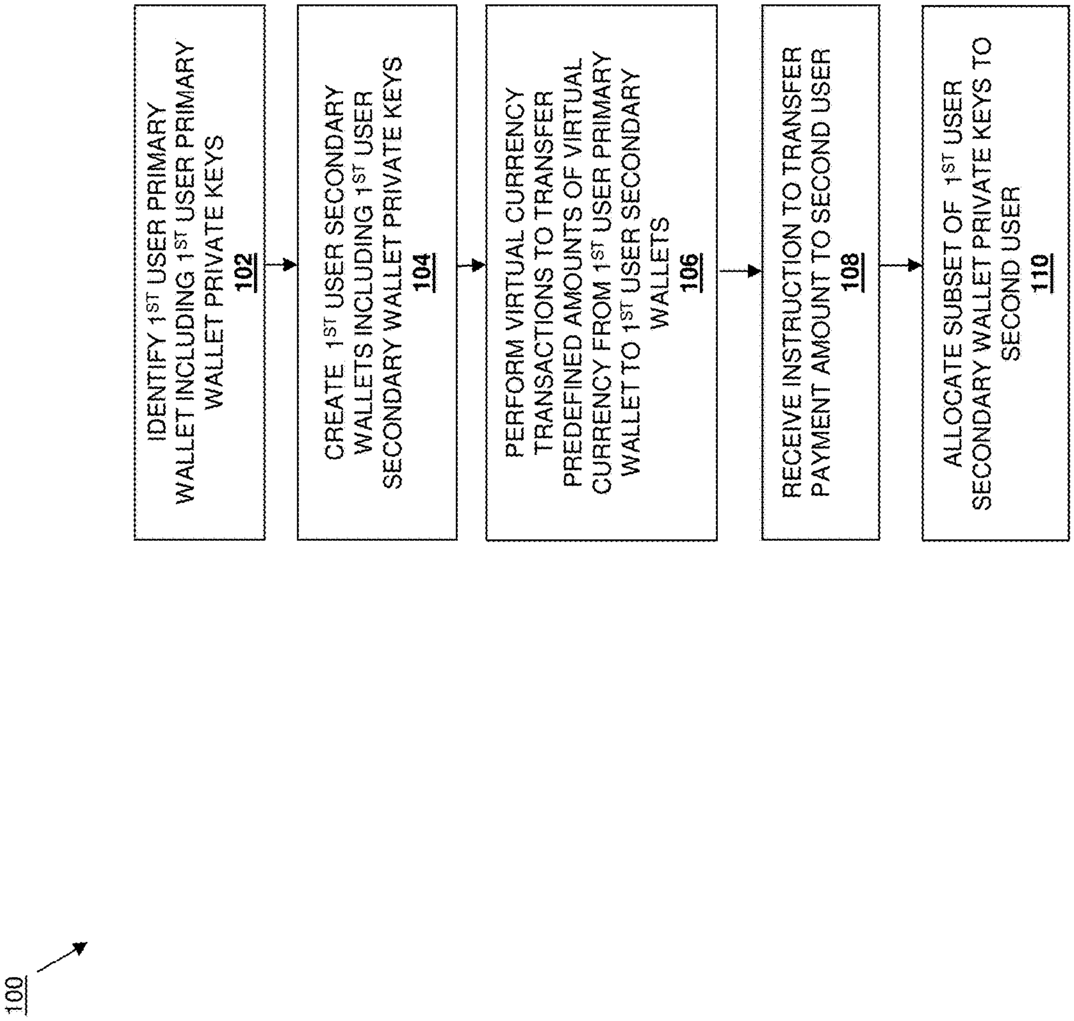
FIG. 1 is a flow chart illustrating an embodiment of a method for providing expedited virtual currency transactions.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for providing expedited virtual currency transactions through the use of private keys. As discussed above, virtual currency transactions may be broadcast to network nodes and then subject to a “mining” process that is performed by the network nodes to ensure that the virtual currency being sent in the virtual currency transaction has not previously been transferred by the payer to another user, and the payee must then wait until the mining process confirms the transaction before transferring goods and/or services to the payer if the payee is to be sure they will receive the virtual currency payment. The systems and methods of the present disclosure practically eliminate the amount of time the payee must wait to be sure they will receive a virtual currency payment in a virtual currency transaction by transferring to the payee private keys that are included in virtual currency wallets that are associated with predefined amounts of virtual currency that equal a payment amount identified in the virtual currency transaction.

As discussed below, a first user may have a first user primary wallet that is associated with a virtual currency (e.g., the first user primary wallet generated public address (es) to which virtual currency was previously sent, and includes private key(s) that may "sign" transactions to transfer the association of the virtual currency at those public address(es) to public address(es) generated by a second user primary wallet of a second user). The systems and methods of the present disclosure may operate to create a plurality of first user secondary wallets and perform virtual currency transactions to transfer the association of predefined amounts of virtual currency from the first user primary wallet to each of the plurality of first user secondary wallets. For example, the plurality of first user secondary wallets may include a first subset of first user secondary wallets that are each associated with a specific amount of virtual currency, e.g., 10 electronic coins, a second subset of first user secondary wallets that are each associated with 1 electronic coin, a third subset of first user secondary wallets that are each associated with 0.1 electronic coins, a four subset of first user secondary wallets that are each associated with 0.01 electronic coins, and so on.

When an instruction is received to transfer a payment amount to a second user, the system and methods of the present disclosure may then allocate to the second user one or more of the first user secondary wallet's private keys included in different first user secondary wallets that are associated with predefined amounts of virtual currency that is equal to the payment amount. For example, if the instruction is received to transfer 14.56 electronic coins to the second user, the systems and methods may operate to allocate to the second user a first user secondary wallet private key included in a first user secondary wallet that is associated with 10 electronic coins, first user secondary wallet private keys included in four first user secondary wallets that are each associated with 1 electronic coin, first user secondary wallet private keys included in 5 first user secondary wallets that are each associated with 0.1 electronic coins, and first user secondary wallet private keys included in 6 first user secondary wallets that are each associated with 0.01 electronic coins. The allocation to the second user of the first user secondary wallet private keys including in the first user secondary wallets ensures the second user that they now control the electronic coins associated with those first user secondary wallets, and that allocation (whether performed in a backend system provider process or via a transmittal of the first user secondary wallet private keys directly to the second user) may occur almost instantaneously. Subsequently, the systems and methods of the present disclosure may then operate to use the first user secondary wallet private keys to transfer the association of the predefined amounts of the virtual currency from the first user secondary wallets to a second user primary wallet of the second user.

Figure 2:
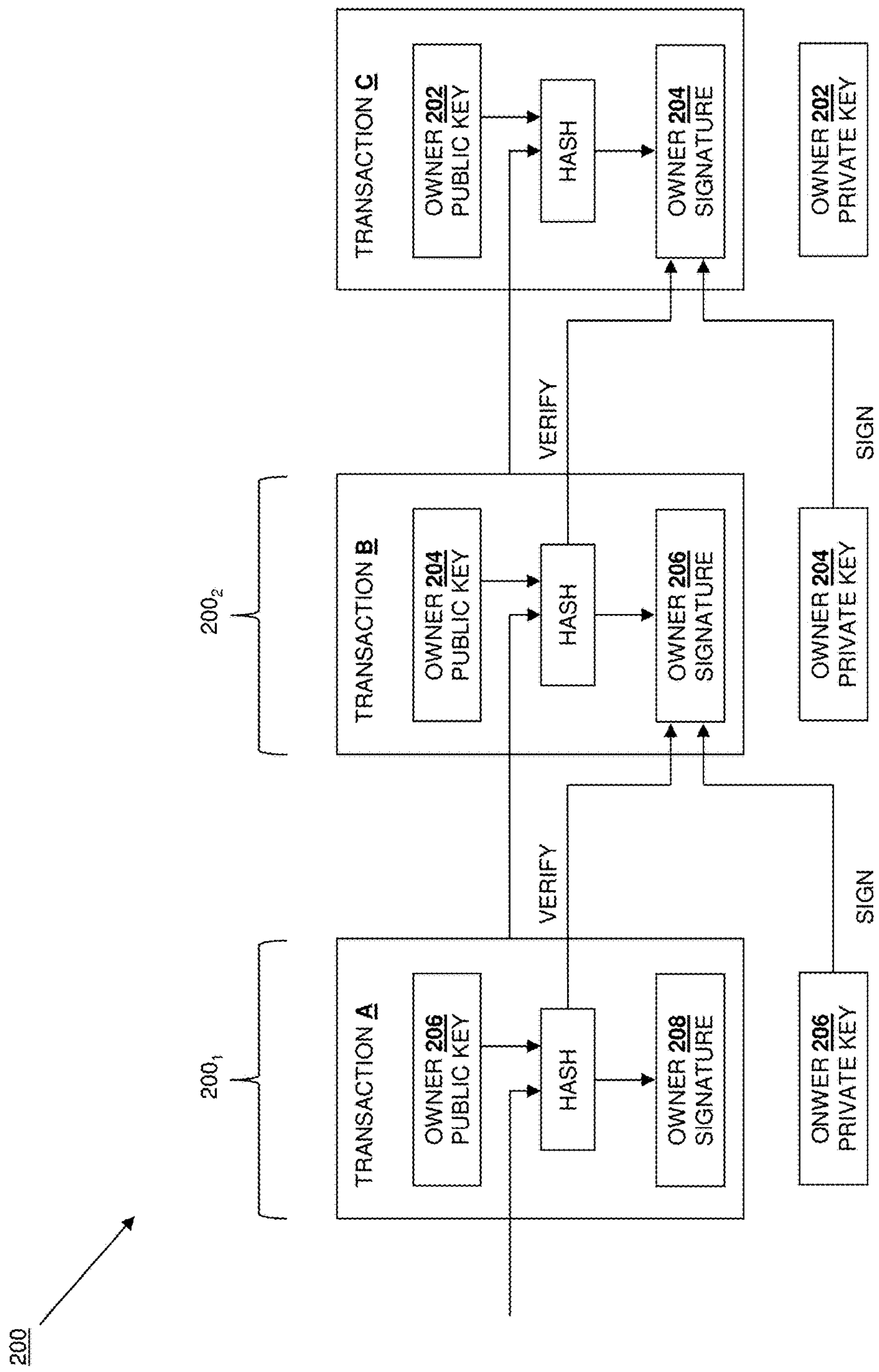
FIG. 2 is a schematic view illustrating an embodiment of an electronic coin.
Figure 3:
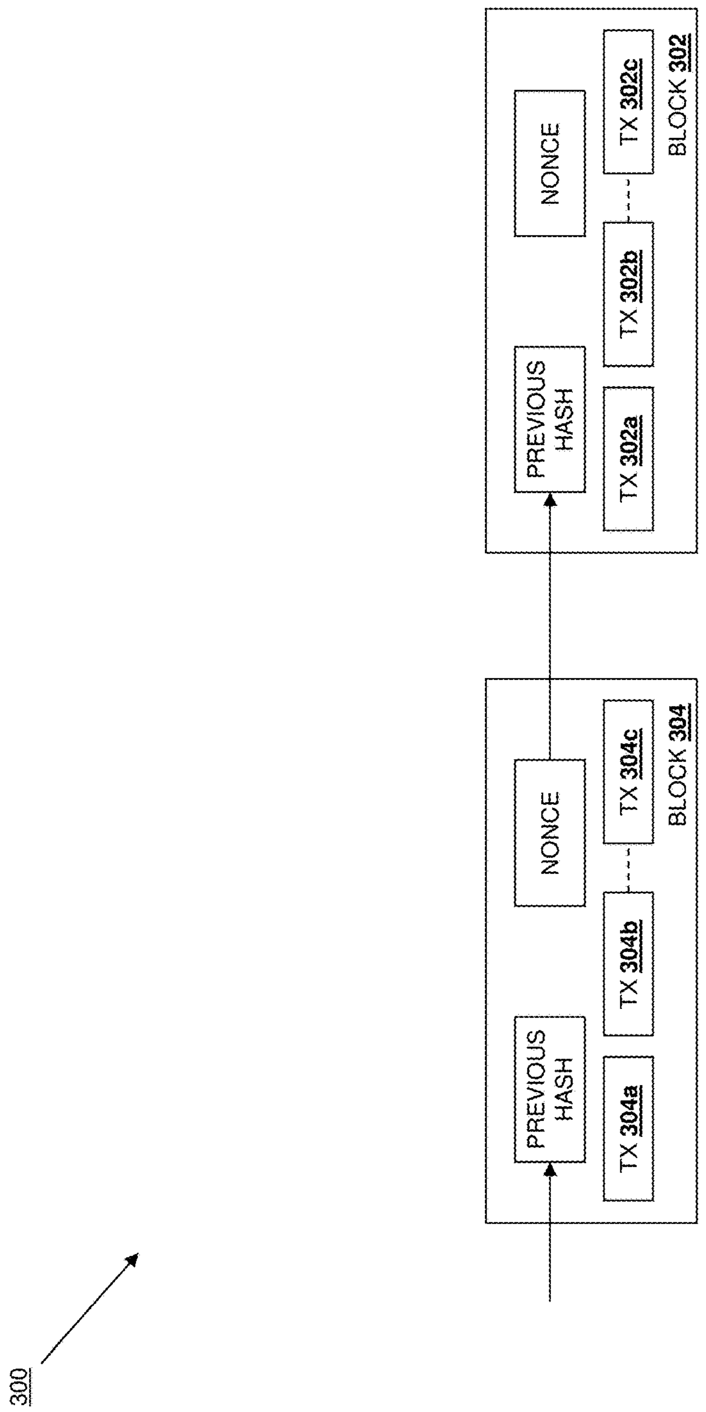
FIG. 3 is a schematic view illustrating an embodiment of a virtual currency public ledger.

Referring now to FIGS. 1, 2, and 3, a method 100 for providing expedited virtual currency transactions is illustrated. In some embodiments of the method 100 described below, one or more system provider devices may operate to perform or enable the method 100. For example, a system provider may utilize system provider device(s) to provide virtual currency wallets to users, which may include controlling the private keys included with those virtual currency wallets for those users. In a specific example, a payment service provider such as, for example, PayPal, Inc. of San Jose, CA, may utilize a payment service provider device to perform the method 100 discussed below, and in some embodiments may operate in cooperation with one or more other system providers (via their system provider devices) and/or users (via their user devices) to perform the method 100 discussed below. In other embodiments of the method 100 described below, one or more user devices may operate to perform or enable the method 100. For example, a user may utilize user device(s) to provide virtual currency wallets, which may include controlling private keys included with those virtual currency wallets. However, these embodiments are meant to be merely exemplary, and one of skill in the art in possession of the present disclosure will recognize that a wide variety of system providers and users may operate, alone or together, to provide the systems and methods discussed herein without departing from the scope of the present disclosure.

Referring now to FIG. 2, an embodiment of an electronic coin 200 that may provide some or all of the virtual currency in the wallets discussed below is illustrated and described briefly for reference in the discussion below. In those embodiments, a virtual currency system associated with the present disclosure may define an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin $\mathbf{200_1}$ defined by digital signatures provided up to transaction A) and the previous transaction (not illustrated, but occurring prior to transaction A) was signed by owner 208 (i.e., the owner providing, as a result of transaction A, the electronic coin $\mathbf{200_1}$ defined by digital signatures provided up to transaction A) using a private key and added to an initial electronic coin (which was defined by digital signatures provided up to the transaction prior to transaction A) such that the electronic coin $\mathbf{200_1}$ was transferred to owner 206.

Similarly, in transaction B, a hash of the public key of owner 204 (i.e., the owner receiving, as a result of transaction B, an electronic coin $\mathbf{200_2}$ defined by digital signatures provided up to transaction B) and transaction A was signed by owner 206 using a private key and added to the electronic coin $\mathbf{200_1}$ such that the electronic coin $\mathbf{200_2}$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 using a private key and added to the electronic coin $\mathbf{200_2}$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coin(s)" may be used to encompass any amount or type of electronic coins.

Referring now to FIG. 3, an embodiment of a virtual currency public ledger 300 is illustrated and described briefly for reference in the discussion below. As discussed above, the virtual currency public ledger 300 operates to verify that payers transferring an electronic coin (e.g., referring back to FIG. 2, owner 206 in transaction A, owner 204 in transaction B, and owner 202 in transaction C) did not "double-spend" (e.g., use a private key to sign any previous transactions involving) that electronic coin. To produce the virtual currency public ledger 300, a distributed network of devices operate to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of work system that includes determining a value that when hashed with the block provides a required number of zero bits.

For example, for a block 302 that includes a plurality of transactions 302*a*, 302*b*, and up to 302*c*, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block).

The electronic coin(s) 200 and virtual currency public ledger 300 discussed above provide a distributed virtual currency system in which payers and payees may participate in transactions with each other without the need for a centralized authority such as a bank. Each of those transactions is recorded in the virtual currency public ledger 300 to ensure that the electronic coins may only be spent by a payer once. However, it has been discovered that the confirmation of those transactions via the proof-of-work system discussed above may unnecessarily delay the transaction, and that such transactions may be expedited by first allocating private keys to a payee, and then subsequently performing the transaction using those private keys and confirming the transaction.

Figure 4:
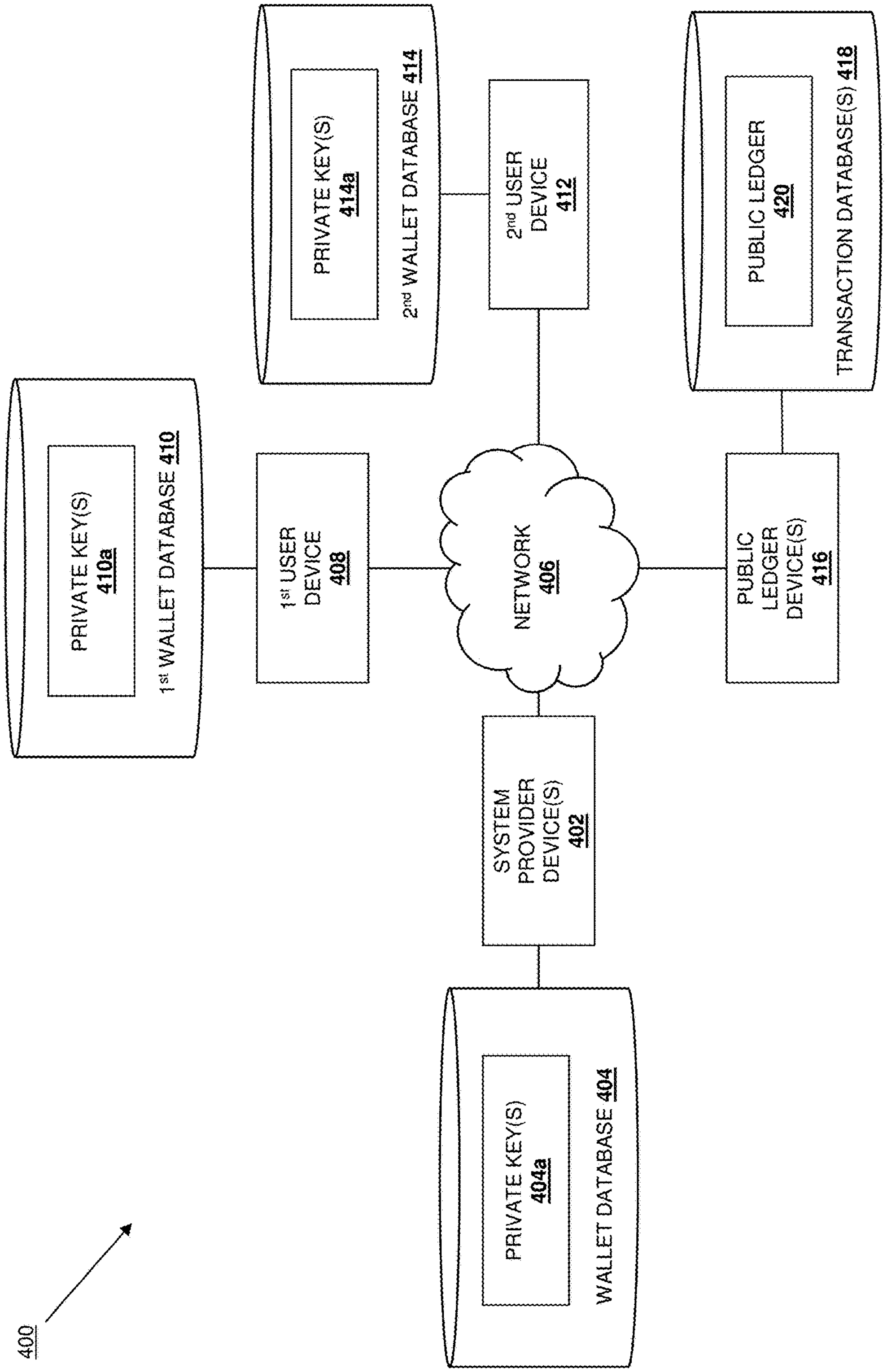
FIG. 4 is a schematic view illustrating an embodiment of an expedited virtual currency transaction system.

Referring now to FIG. 4, an embodiment of an expedited virtual currency transaction system 400 is illustrated and described briefly for reference in the method 100 discussed below. Some embodiments of the expedited virtual currency transaction system 400 include one or more system provider device(s) 402 that are coupled to a wallet database 404 and a network 406. In those embodiments, the system provider device(s) 402 may provide virtual currency wallets to users, with those virtual currency wallets associated with a virtual currency and including respective private keys 404*a* that may be utilized to transfer the association of virtual currency to other virtual currency wallets (e.g., by signing transactions to transfer the ownership of electronic coins as described above with reference to FIG. 2). As such, in some embodiments, the system provider device(s) 402 may control the private keys included with the primary and secondary wallets of users discussed below. However, as discussed below, the system provider device(s) 402 and wallet database 404 may be omitted in other embodiments (e.g., embodiments where users utilized user devices that provide the primary and secondary wallets and thus control the associated private keys).

Other embodiments of the expedited virtual currency transaction system 400 include a first user device 408 that is coupled to a first wallet database 410 and the network 406, and a second user device 412 that is coupled to a second wallet database 414 and the network 406. In those embodiments, the first user device 408 and the second user device 412 may provide virtual currency wallets for a first user and a second user, respectively, with those virtual currency wallets associated with a virtual currency and including respective private keys 410*a* and 414*a* that may be utilized to transfer the association of virtual currency to other virtual currency wallets (e.g., by signing transactions to transfer the ownership of electronic coins as described above with reference to FIG. 2). As such, in some embodiments, the users in the system may control the private keys included with their primary and secondary wallets discussed below. However, in embodiments such as those discussed above in which a system provider device controls the private keys included with primary and secondary wallets of users, user devices need not include the wallet databases, and rather may include wallet software configured to communicate with the system provider device(s) 402 to enable the functionality discussed below. Furthermore, in some embodiments, the system provider device(s) 402, the first user device 408, and/or the second user device 412 may be utilized during the method 100 to, for example, perform multi-signature virtual currency transactions and/or other multi-user and/or multi-device virtual currency functionality known in the art.

In the illustrated embodiment, the expedited virtual currency transaction system 400 may also include public ledger device(s) 416 that are coupled to a transactional database 418 and the network 406. As discussed above, the public ledger device(s) 416 may operate to receive virtual currency transactions broadcast by the system provider device(s) 402, the first user device 408, and/or the second user device 412, confirm those transactions, and generate a public ledger 420 as discussed above with reference to FIG. 3.

Figure 5:
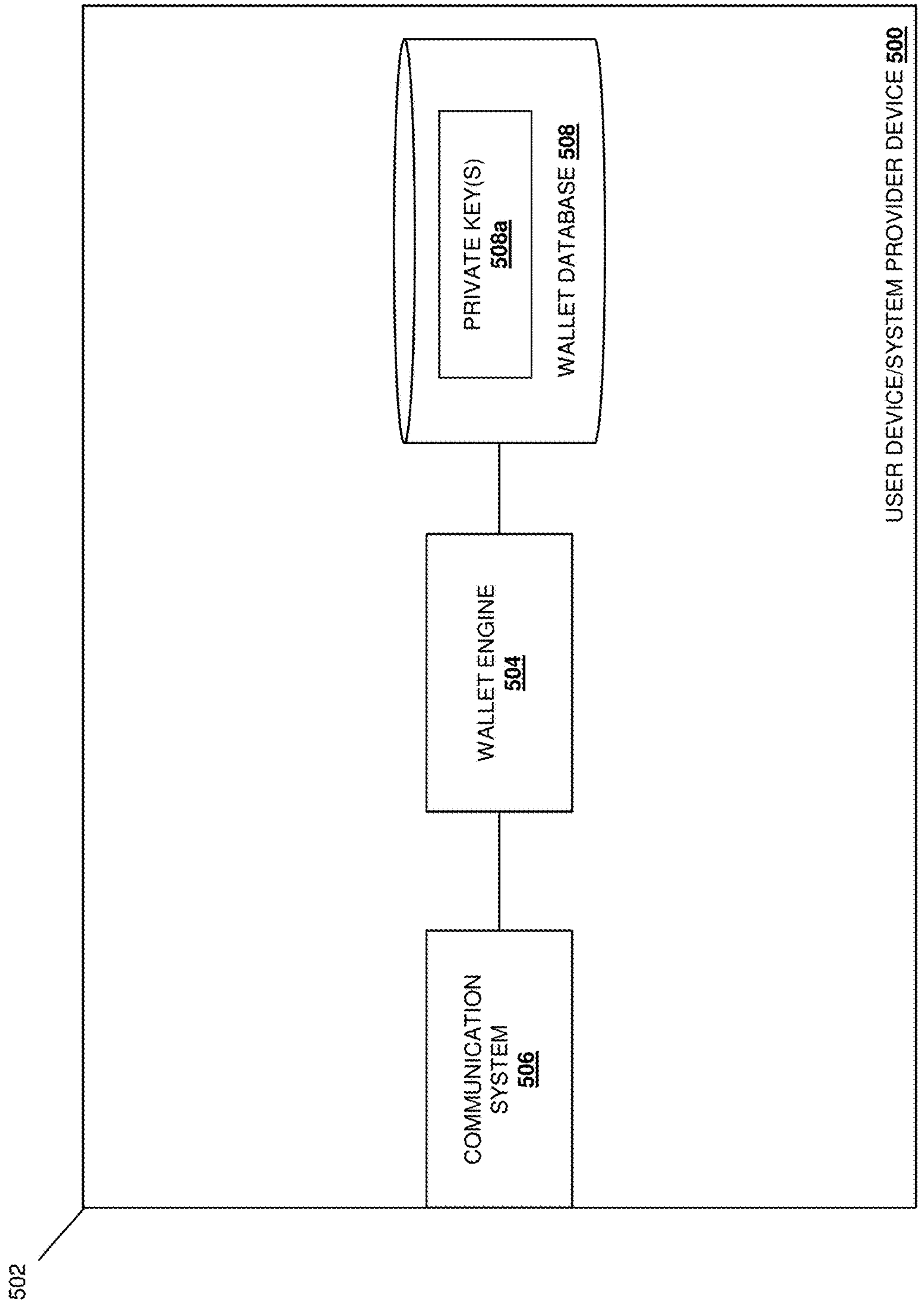
FIG. 5 is a schematic view illustrating an embodiment of a user device or system provider device used in the virtual currency transaction system of FIG. 4.

Referring now to FIG. 5, an embodiment of a device 500 is illustrated that in some embodiments may be the system provider device(s) 402 discussed above, and in other embodiments may be the first user device 408 or the second user device 412 discussed above. As such, in some examples (e.g., those where the device 500 is provided for the system provider device(s) 402), the device 500 may be provided by one or more server devices, while in other examples (e.g., those where the device 500 is provided for the first user device 408 or the second user device 412), the device 500 may be provided by a desktop computing system, a laptop/notebook computing system, a tablet computing system, a mobile phone, and/or other user devices known in the art. However, one of skill in the art in possession of the present disclosure will recognize that the device 500 may be provided by any of a variety of computing device in the different examples discussed below.

In the illustrated embodiment, the device 500 includes a chassis 502 that houses the components of the device 500, only some of which are illustrated in FIG. 5. For example, the chassis 502 may house a processing system (not illustrated) and a non-transitory memory system (not illustrated) that includes instructions that, when executed by the processing system, cause the processing system to provide a wallet engine 504 that is configured to perform the functions of the wallet engines and devices discussed below. In a specific example, the wallet engine 504 is configured to provide a virtual currency wallet with conventional virtual currency wallet functionality, as well as the functionality discussed according to the method 100 below. The chassis 502 may also house a communication system 506 that is coupled to the wallet engine 504 (e.g., via a coupling between the communication system 506 and the processing system) and configured to provide for communication through the network 406 as detailed below. In the illustrated embodiment, device 500 also includes a storage device with a wallet database 508 having private key(s) 508*a* included with primary and secondary wallets, discussed in further detail below. While the device is illustrated as including a chassis 502 that houses the wallet database 508, one of skill in the art in possession of the present disclosure will recognize that the wallet database may be provided in a different device/chassis than the device 500 such as, for example, a network attached storage device, a non-network attached computing device (e.g., a "cold storage" device), and/or any other device or storage system known in the art.

In some embodiments, the system provider device(s) 402 may provide a wallet application through the network to the first user device 408 and/or the second user device 412 prior to or during the method 100, and that wallet application may provide the wallet engine 504 in the first user device 408 and/or the second user device 412. However, in other embodiments, the wallet application may be provided on the first user device 408 and/or the second user device 412 by respective users separately from the method 100.

Referring back to FIG. 1, the method 100 begins at block 102 where a first user primary wallet including first user primary wallet key(s) is identified. In some embodiments, the identification of the first user primary wallet at block 102 may be performed by the system provider device(s) 402. For example, a first user of the first user device 408 may send a request (e.g., via the wallet engine 504 and/or the communication system 506) through the network 406 to the system provider device(s) 402 to enable expedited virtual currency transactions, and that request may identify a first user primary wallet for which the private keys are controlled by the system provider device(s) 402 (e.g., in the wallet database 404). As such, wallet software operating on the first user device 408 may provide a Graphical User Interface (GUI) for display on the first user device 408 that allows the first user to identify their first user primary wallet (provided to the first user by the system provider device(s) 402) and provide an instruction to enable the expedited virtual currency transactions described below. Similarly, the second user of the second user device 412 discussed below may provide a similar instruction to the system provider device(s) 402 as well.

In another example, a virtual currency transaction may associate virtual currency with the first user primary wallet that includes first user primary wallet private keys that are controlled by the system provider device(s) 402 (e.g., in the wallet database 404), and the system provider device(s) 402 may identify the first user primary wallet in response to detecting that transfer to the first user primary wallet. As such, in some examples, a first and/or subsequent transfer of virtual currency to public addresses generated by a primary wallet provided to a user by the system provider may cause that primary wallet to be identified by the system provider device(s) 402 at block 102.

In some embodiments, the identification of the first user primary wallet at block 102 may be performed by the first user device 408. For example, a first user of the first user device 408 may provide an input to the first user device 408 to enable expedited virtual currency transactions, and that request may identify (or default to) a first user primary wallet for which the private keys are controlled by the first user device 408 (e.g., in the 1$^{st}$ wallet database 410). As such, wallet software operating on the first user device 408 may provide a Graphical User Interface (GUI) for display on the first user device 408 that allows the first user to identify their first user primary wallet (provided to the first user by the system provider device(s) 402) and provide an instruction to enable the expedited virtual currency transactions described below. Similarly, the second user of the second user device 412 discussed below may provide a similar instruction to the second user device 412 as well.

In another example, a virtual currency transaction may associate virtual currency with the first user primary wallet that includes first user primary wallet private keys that are controlled by the first user device 408 (e.g., in the 1$^{st}$ wallet database 410), and the first user device 408 may identify the first user primary wallet in response to detecting that transfer to the first user primary wallet. As such, in some examples, a first and/or subsequent transfer of virtual currency to public addresses generated by a primary wallet provided by a user device may cause that primary wallet to be identified by the user device at block 102.

Similarly as discussed above, the first user primary wallet identified at block 102 is associated with a virtual currency, and includes first user primary wallet private key(s) that may be utilized to sign transactions that transfer the association of virtual currency from the first user primary wallet (i.e., from public addresses generated by that first user primary wallet) to another user (e.g., to public addresses generated by a second user primary wallet provided for the second user of the second user device 412.) As discussed herein, the "primary" wallet provided by the wallet applications/wallet engines of the present disclosure may be wallets of users that are primarily utilized to receive virtual currency from other users, and are distinguished from "secondary" wallets that may be wallets of users that are primarily utilized to provide the expedited virtual currency transactions discussed below. As would be understood by one of skill in the art in possession of the present disclosure, wallet applications/wallet engines may be configured to provide wallets that generate public addresses to which other users may "send" virtual currency to transfer the association of that virtual currency to that wallet, and then the private key(s) associated with that wallet must be utilized to then transfer that virtual currency from those public addresses to public addresses generated by another user's wallet. While from a payee perspective, the primary wallets are discussed below as being primarily utilized to receive virtual currency from other users, and secondary wallets are discussed below as being primarily utilized to send virtual currency to other users, the primary wallets also perform sending functionality (i.e., to the secondary wallets) and the secondary wallets also perform receiving functionality (i.e., from the primary wallet) that may be performed "in the background". As such, users need not explicitly know about the secondary wallets, as the wallet engine may perform functionality associated with the secondary wallets in a manner that is transparent to the user, leading the user to believe that virtual currency is simply sent and received using their primary wallet.

In some embodiments, as discussed below, an instruction to enable expedited virtual currency transaction may activate functionality in the wallet engine 504 that is configured to subsequently render private keys associated with secondary wallets unusable upon the sending of an instruction to transfer a payment amount that results in those private keys being sent to the user receiving that payment amount. For example, an instruction by the first user to the first user device 408 to enable expedited virtual currency transactions may cause the wallet engine 504 to enable private key disablement functionality that, upon the first user providing an instruction to transfer a payment amount to the second user and the first user device 408 subsequently selecting a subset of second user first user secondary wallet private keys associated with first user secondary wallets that have predefined amounts equal to the payment amount, disables the use of those first user secondary wallet private keys such that they are no longer configured to sign transactions that transfer the association of virtual currency from those first user secondary wallets to another user.

The method 100 then proceeds to block 104 where first user secondary wallets are created that include first user secondary wallet private keys. In an embodiment, the creation of the first user secondary wallets at block 104 is performed by the system provider device(s) 402. For example, in response to an instruction from the first user, or in response to detecting a transfer of virtual currency into the first user primary wallet, the system provider device(s) 402 may create a plurality of first user secondary wallets that may each be associated with one or more first user secondary wallet private keys. In another embodiment, the creation of the first user secondary wallets at block 104 is performed by the first user device 408. For example, in response to an input from the first user, or in response to detecting a transfer of virtual currency into the first user primary wallet, the user device 408 may create a plurality of first user secondary wallets that may each be associated with one or more first user secondary wallet private keys. In different embodiments, the number of first user secondary wallets created at block 104 may differ, and one of skill in the art in possession of the present disclosure will recognize that any number of first user secondary wallets may be created to enable the expedited virtual currency transactions described below. For example, the number of first user secondary wallets created at block 104 may depend on the amount of virtual currency in the first user primary wallet, the number of transactions previously engaged in (or expected to be engaged in) by the first user, and/or any other virtual currency characteristics known in the art.

In some embodiments, the creation of the plurality of first user secondary wallets may occur prior to the method 100. For example, the system provider device(s) 402 or the first user device 408 may automatically create the plurality of first user secondary wallets when the first user creates (or provides an instruction to create) the first user primary wallet. As discussed above, in some examples the wallet application/wallet engine may be configured to create "shadow" secondary wallets that may not be visible to a user that creates a primary wallet. Further still, system provider device(s) that control the first user primary wallet and its first user primary wallet private keys for the first user may create secondary wallets that need not necessarily be considered "first user" secondary wallets that are specifically dedicated to the first user. For example, the system provider device(s) may create primary wallets at the requests of users (e.g., the first user primary wallet at the request of the first user), and may also create secondary wallets that are not immediately designated for any particular user, but that may be utilized to expedite virtual currency transactions conducted by users using their primary wallets (provided by the system provider device(s) 402) as discussed below, with the system provider subsequently reimbursed using the primary wallet of the first user. Thus, while a few examples of the creation of secondary wallets have been described, different combinations of those examples are envisioned as falling within the scope of the present disclosure as well.

The method 100 then proceeds to block 106 where virtual currency transactions are performed to transfer predefined amounts of virtual currency from the first user primary wallet to the first user secondary wallets. In some embodiments, the virtual currency transactions are performed at block 106 by the system provider device(s) 402. For example, the system provider device(s) 402 may access the first user primary wallet private keys for the first user primary wallet in the wallet database 404, and use those first user primary wallet private keys to sign virtual currency transactions that transfer the association of predefined amounts of virtual currency from the first user primary wallet to the first user secondary wallets. In some embodiments, the virtual currency transactions are performed at block 106 by the first user device 408. For example, the first user device 408 may access the first user primary wallet private keys for the first user primary wallet in the first wallet database 410, and use those first user primary wallet private keys to sign virtual currency transactions that transfer the association of predefined amounts of virtual currency from the first user primary wallet to the first user secondary wallets. As discussed above, the performance of block 106 may be automatic. For example, either of the system provider device(s) 402 or the first user device 408 may automatically perform the virtual currency transactions to transfer predefined amounts of virtual currency to each of the plurality of first user secondary wallets in response to determining that virtual currency has been transferred to public addresses that were generated by the first user primary wallet. As such, the transfer of virtual currency to a primary wallet may result in the automatic allocation of some portion of that virtual currency to secondary wallets in predefined amounts.

Figure 6:
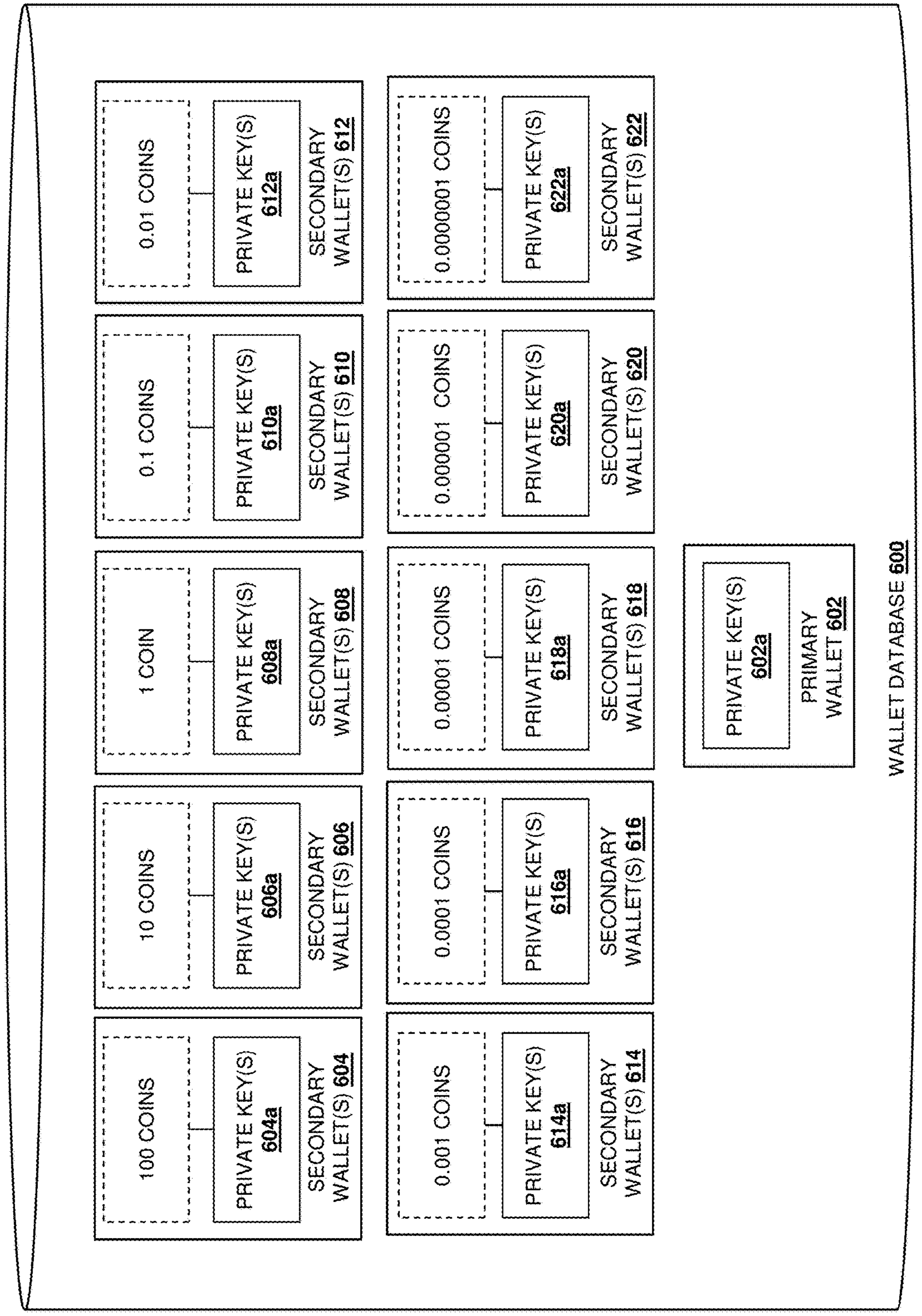
FIG. 6 is a schematic view illustrating an embodiment of a wallet database used in the virtual currency transaction system of FIG. 4.

Referring now to FIG. 6, an embodiment of a wallet database 600 is illustrated that may be either of the wallet databases 404 (i.e., when the system provider device(s) 402 perform the method 100) or 410 (i.e., when the first user device 408 performs the method 100) discussed above with reference to FIG. 4. As can be seen in FIG. 6, the wallet database 600 includes data associated with a primary wallet 602 that includes private keys 602*a*, which may be the first user primary wallet and first user primary wallet private keys discussed above. In various examples, the primary wallet 602 may be associated with any amount of virtual currency (i.e., the private key(s) 602*a* may be configured to sign transactions to transfer the association of virtual currency from public addresses generated by the primary wallet to public addresses generated by a wallet of another user).

Furthermore, the wallet database 600 also includes data associated with a plurality of subsets of secondary wallets, including a first subset of secondary wallets 604, a second subset of secondary wallets 606, a third subset of secondary wallets 608, a fourth subset of secondary wallets 610, a fifth subset of secondary wallets 612, a sixth subset of secondary wallets 614, a seventh subset of secondary wallets 616, an eighth subset of secondary wallets 618, a ninth subset of secondary wallets 620, and a tenth subset of secondary wallets 622 in the illustrated embodiment. As illustrated, each of the subsets of secondary wallets 604-622 include respective private key(s) 604*a*-622*a*. Furthermore, each subset of secondary wallets in the plurality of subsets of secondary wallets is associated with a predefined amount of virtual currency.

For example, each of the first subset of secondary wallets 604 is associated with 100 electronic coins in response to the virtual currency transactions performed at block 106, each of the second subset of secondary wallets 606 is associated with 10 electronic coins in response to the virtual currency transactions performed at block 106, each of the third subset of secondary wallets 608 is associated with 1 electronic coin in response to the virtual currency transactions performed at block 106, each of the fourth subset of secondary wallets 610 is associated with 0.1 electronic coins in response to the virtual currency transactions performed at block 106, each of the fifth subset of secondary wallets 612 is associated with 0.01 electronic coins in response to the virtual currency transactions performed at block 106, each of the sixth subset of secondary wallets 614 is associated with 0.001 electronic coins in response to the virtual currency transactions performed at block 106, each of the seventh subset of secondary wallets 616 is associated with 0.0001 electronic coins in response to the virtual currency transactions performed at block 106, each of the eighth subset of secondary wallets 618 is associated with 0.00001 electronic coins in response to the virtual currency transactions performed at block 106, each of the ninth subset of secondary wallets 620 is associated with 0.000001 electronic coins in response to the virtual currency transactions performed at block 106, and each of the tenth subset of secondary wallets 622 is associated with 0.0000001 electronic coins in response to the virtual currency transactions performed at block 106

While the primary wallet 602 and the subsets of secondary wallets are illustrated as located in the same wallet database 600 (e.g., in situations where the first user device 408 provides the first user primary wallet and the first user secondary wallets), in other embodiments the primary wallet 602 and the subsets of secondary wallets may be located in different wallet databases. In the specific example discussed above where the system provider device(s) 402 creates secondary wallets without designating those secondary wallets to particular users or the primary wallets of those users, those secondary wallets may be associated with virtual currency that was transferred from wallets controlled by the system provider device(s) 402, and thus the secondary wallets may be in different databases from each other and any primary wallets that are provided to users by the system provider device(s) 402.

In some embodiments, the wallet engine 504 in the system provider device(s) 402 or the first user device 408 may operate to maintain the number of secondary wallets in each of the subsets of the secondary wallets 604-622 such that a minimum number of secondary wallets each having a particular predetermined amount of virtual currency are included in the wallet database 600. Thus, as private keys associated with secondary wallets are allocated to other users, the wallet engine 504 may perform block 106 to transfer the association of predefined amounts of virtual currency from the primary wallet 602 to secondary wallets in order to replace the secondary wallets that were allocated to that other user, as discussed in further detail below.

The method 100 then proceeds to block 108 where instructions are received to transfer a payment amount to a second user. In an embodiment, the instructions to transfer the payment amount to the second user are received at block 108 by the system provider device(s) 402. For example, the first user may use the first user device 408 to provide an instruction through the network 406 to the system provider device(s) 402 to transfer a payment amount to the second user of the second user device 412. In another embodiment, the instructions to transfer the payment amount to the second user are received at block 108 by the user device 408. For example, the first user may provide an input to the first user device 408 to transfer a payment amount to the second user of the second user device 412 (e.g., by identifying a public address generated by a wallet of the second user, and identifying the payment amount).

In an embodiment, the wallet engine 504 in the system provider device(s) 402 or the user device 408 may receive the instruction, determine the second user identified in the instruction, and determine the payment amount identified in the instruction. In some examples, the determination of the payment amount may include a determination of a physical currency that is identified as the payment amount. In situations where the payment amount is identified as a physical currency, the wallet engine 504 may then determine an exchange rate between the physical currency and the virtual currency in order to determine an amount of virtual currency that corresponds to the physical currency identified as the payment amount.

The method 100 then proceeds to block 110 where a subset of first user secondary wallet private keys are allocated to the second user. In an embodiment, the subset of the first user secondary wallet private keys are allocated at block 108 by the system provider device(s) 402. For example, in situations where the system provider device(s) 402 provide the first user primary wallet for the first user that is sending the payment amount, and provide the second user primary wallet to the second user that is receiving the payment amount, the wallet engine 504 in the system provider device(s) 402 may allocate to the second user secondary wallet private keys for secondary wallets that are associated with predefined virtual currency amounts that add up to the payment amount. In another example, in situations where the system provider device(s) 402 provide the first user primary wallet for the first user that is sending the payment amount, but do not provide the second user primary wallet to the second user that is receiving the payment amount, the wallet engine 504 in the system provider device(s) 402 may transmit to the second user (e.g., via a variety of secure communication techniques) the second user secondary wallet private keys for secondary wallets that are associated with predefined virtual currency amounts that add up to the payment amount.

As discussed above, the transfer of the subset of the first user secondary wallet private keys to the second user by the system provider device(s) 402 may be accompanied by the performance of private key disablement functionality by the system provider device(s) 402 that renders any copy of that subset of the first user secondary wallet private keys that may exist on the system provider device(s) 402 unusable in signing a transaction. Such private key disablement functionality may include erasing or deleting that subset of the first user secondary wallet private keys from the system provider device(s) 402, modifying that subset of the first user secondary wallet private keys on the system provider device(s) 402, and/or otherwise making the copy of that subset of the first user secondary wallet private keys that may exist on the system provider device(s) 402 invalid for signing a transaction that would transfer the association of the predefined amounts of virtual currency in their respective first user secondary wallets to any other user.

In an embodiment, the subset of the first user secondary wallet private keys are allocated at block 108 by the first user device 408. For example, the first user device 408 may transmit to the second user (e.g., via a variety of secure communication techniques) the second user secondary wallet private keys for secondary wallets that are associated with predefined virtual currency amounts that add up to the payment amount. As discussed above, the transfer of the subset of the first user secondary wallet private keys to the second user by the first user device 408 may be accompanied by the performance of private key disablement functionality by the first user device 408 that renders any copy of that subset of the first user secondary wallet private keys that may exist on the first user device 408 unusable in signing a transaction. Such private key disablement functionality may include erasing or deleting that subset of the first user secondary wallet private keys from the first user device 408, modifying that subset of the first user secondary wallet private keys on the first user device 408, and/or otherwise making the copy of that subset of the first user secondary wallet private keys that may exist on the first user device 408 invalid for signing a transaction that would transfer the association of the predefined amounts of virtual currency in their respective first user secondary wallets to any other user.

In a specific example, the wallet engine 504 in the system provider device(s) 402 or user device 408 may select the subset of first user secondary wallet private keys by determining a combination of at least some different predefined amounts of virtual currency in the different subsets of the plurality of secondary wallets that add up to the payment amount. In a specific example, a payment amount of 123.485 electronic coins may cause the wallet engine 504 to select first user secondary wallet private keys associated with one of the first subset of secondary wallet(s) 604, two of the second subset of secondary wallets 606, three of the third subset of secondary wallets 608, four of the fourth subset of secondary wallets 610, eight of the fifth subset of secondary wallets 612, and five of the sixth subset of secondary wallets 614. However, any combinations of secondary wallets with predefined amounts of virtual currency that add up to the payment amount will fall within the scope of the present disclosure.

As discussed above, when the first user secondary wallet private keys are transferred to the second user, such transfers may be performed through secure communication channels. In some embodiments, the transfer of the subset of first user secondary wallet private keys may be performed by first encrypting the subset of first user secondary wallet private keys to provide an encrypted subset of first user secondary wallet private keys, and then transmitting the encrypted subset of first user secondary wallet private keys to the second user device 412. One of skill in the art in possession of the present disclosure will recognize that the encrypting the subset of first user secondary wallet private keys allows for the transfer of the encrypted subset of first user secondary wallet private keys via non-secure communication channels.

One of skill in the art in possession of the present disclosure will recognize that the allocation or transfer of the private keys to the second user puts those private keys in control of the second user, and ensures the second user that they now control the virtual currency associated with the wallets that includes those private keys. As such, the immediate allocation of the first user secondary wallet private keys to the second user upon the receipt of the instruction to transfer the payment amount to the second user provides for an expedited virtual currency transaction that has not been subject to the confirmation performed during the mining process performed by the public ledger devices 416, but that still allows the second user to "complete" the transaction with the first user by providing goods and/or services to the first user. The second user may then subsequently use those first user secondary wallet private keys to sign transactions that transfer the predefined amounts of virtual currency associated with the first user secondary wallets to the second user primary wallet of the second user.

For example, the second user device 412 may receive the first user secondary wallet private keys at block 110. As discussed above, in some embodiments the first user secondary wallet private keys may be encrypted and provided to the second user device 412 and, as such, the second user device 412 may operate to first decrypt the encrypted first user secondary wallet private keys using decryption techniques known in the art, and may then store the first user secondary wallet private keys in a storage (e.g., in the $2^{nd}$ wallet database 414). Furthermore, the wallet engine 504 in the second user device 412 may then perform respective virtual currency transactions using each of the subset of first user secondary wallet private keys received at block 110 (e.g., by using those first user secondary wallet private keys to sign the transactions as discussed above) that transfer the association of the predefined amounts of virtual currency from their respective first user secondary wallets to the second user primary wallet. In some embodiments, the virtual currency transactions performed to transfer the association of the predefined amounts of virtual currency from the first user secondary wallets to the second user primary wallet may be performed automatically upon receipt by the second user device 412/wallet engine 504 of the first user secondary wallet private keys. As such, the receipt of the first user secondary wallet private keys may be transparent to the second user, as the automatic transfer performed by signing transactions with those first user secondary wallet private keys may appear to the second user as their first user primary wallet receiving virtual currency in an amount equal to the payment amount.

In other examples, the second user device 412 may receive an indication that the first user secondary wallet private keys have been allocated by the system provider device(s) 402 to the second user at block 110. Furthermore, the wallet engine 504 in the system provider device(s) 402 may then perform respective virtual currency transaction using each of the first user secondary wallet private keys (e.g., by using those first user secondary wallet private keys to sign the transactions as discussed above) that transfer the association of the predefined amounts of virtual currency from the respective first user secondary wallets to the second user primary wallet. Similarly as discussed above, in some embodiments the virtual currency transactions performed to transfer the association of the predefined amounts of virtual currency from the first user secondary wallets to the second user primary wallet may be performed automatically upon receipt by the system provider device(s) 402/wallet engine 504 of the first user secondary wallet private keys.

Thus, systems and methods have been described that provide for expedited virtual currency transactions by providing for a transfer of predefined amounts of virtual currency that add up to a desired payment amount via the allocation of private keys included in secondary wallets that are associated with those predefined amounts of virtual currency. The primary wallet of a payer holding virtual currency may have previously had that virtual currency separated into predefined amounts associated with the secondary wallets so that, at the time of a transaction with a payee, the private keys included in those secondary wallets may be almost instantly allocated to the payee while also ensuring the payee that they now control the secondary wallets with those predefined amounts of virtual currency. Wallet engines may be automated to then automatically perform virtual currency transactions with the secondary wallet private keys to immediately transfer the association of the predefined amounts of virtual currency from the secondary wallets to the primary wallet of the payee, thus making the expedited virtual currency transaction transparent to the payee.

Figure 7:
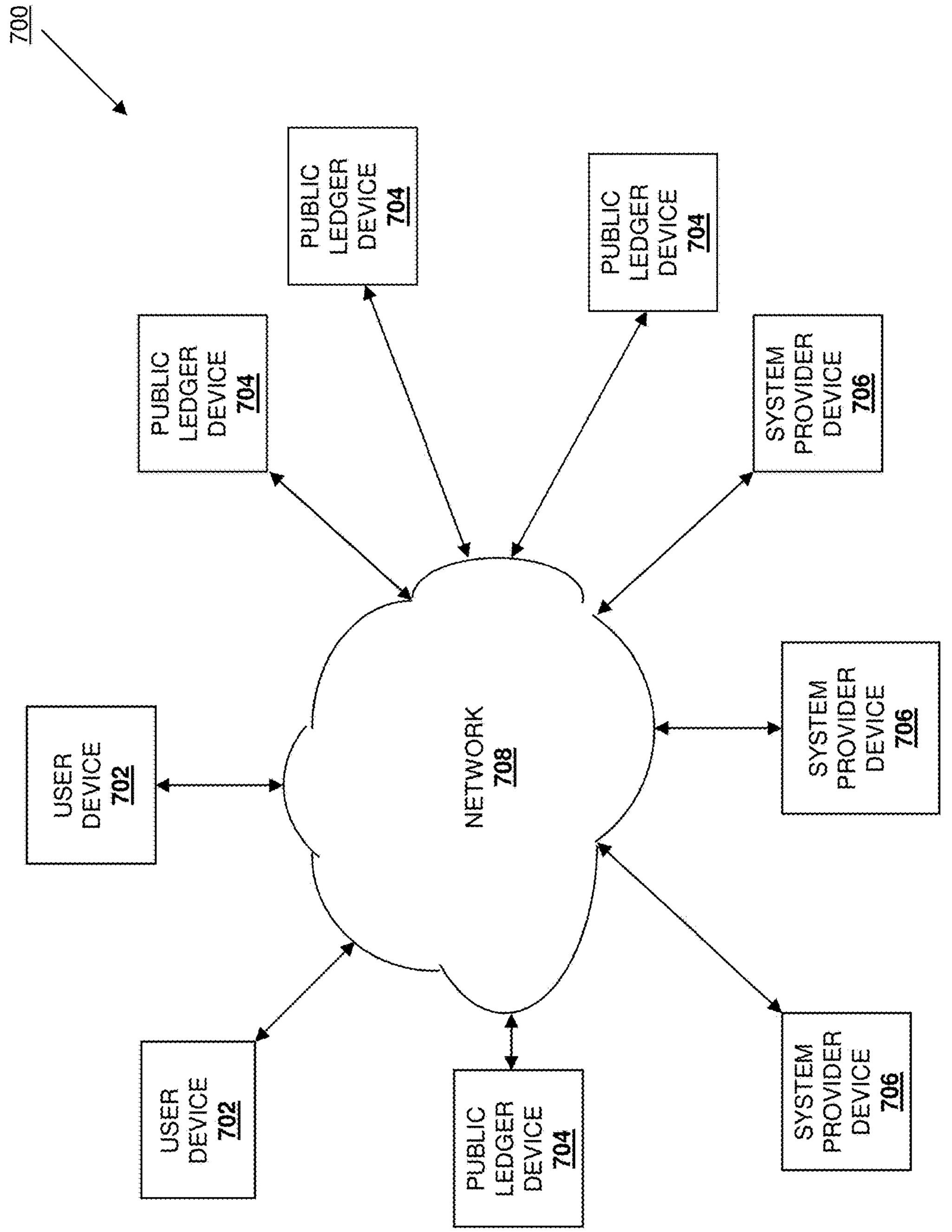
FIG. 7 is a schematic view illustrating an embodiment of a networked system.

Referring now to FIG. 7, an embodiment of a networked system 700 used in the public ledger authentication system 400 described above is illustrated. The networked system 700 includes a plurality of user devices 702, a plurality of public ledger devices 704, and a plurality of system provider devices 706 in communication over a network 708. Any of the user devices 702 may be the user devices operated by the users, discussed above. Any of the public ledger devices 704 may be the public ledger devices discussed above. Any of the system provider devices 706 may be the system provider devices operated by the system providers, discussed above.

The user devices 702, public ledger devices 704, and/or system provider devices 706 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 708.

The network 708 may be implemented as a single network or a combination of multiple networks. For example, in various embodiments, the network 708 may include the Internet and/or one or more intranets, landline networks, wireless networks, and/or other appropriate types of networks.

The user devices 702 may be implemented using any appropriate combination of hardware and/or software configured for wired and/or wireless communication over network 708. For example, in one embodiment, the user devices 702 may be implemented as a personal computer of a user in communication with the Internet. In other embodiments, the user devices 702 may be a smart phone, wearable computing device, laptop computer, and/or other types of computing devices.

The user devices 702 may include one or more browser applications which may be used, for example, to provide a convenient interface to permit the payer to browse information available over the network 708. For example, in one embodiment, the browser application may be implemented as a web browser configured to view information available over the Internet.

The user devices 702 may also include one or more toolbar applications which may be used, for example, to provide user-side processing for performing desired tasks in response to operations selected by the user. In one embodiment, the toolbar application may display a user interface in connection with the browser application.

The user devices 702 may further include other applications as may be desired in particular embodiments to provide desired features to the user devices 702. In particular, the other applications may include a payment application for payments assisted by a payment service provider. The other applications may also include security applications for implementing user-side security features, programmatic user applications for interfacing with appropriate application programming interfaces (APIs) over the network 708, or other types of applications. Email and/or text applications may also be included, which allow the user to send and receive emails and/or text messages through the network 708. The user devices 702 include one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used to associate the user with a particular account as further described herein.

Figure 8:
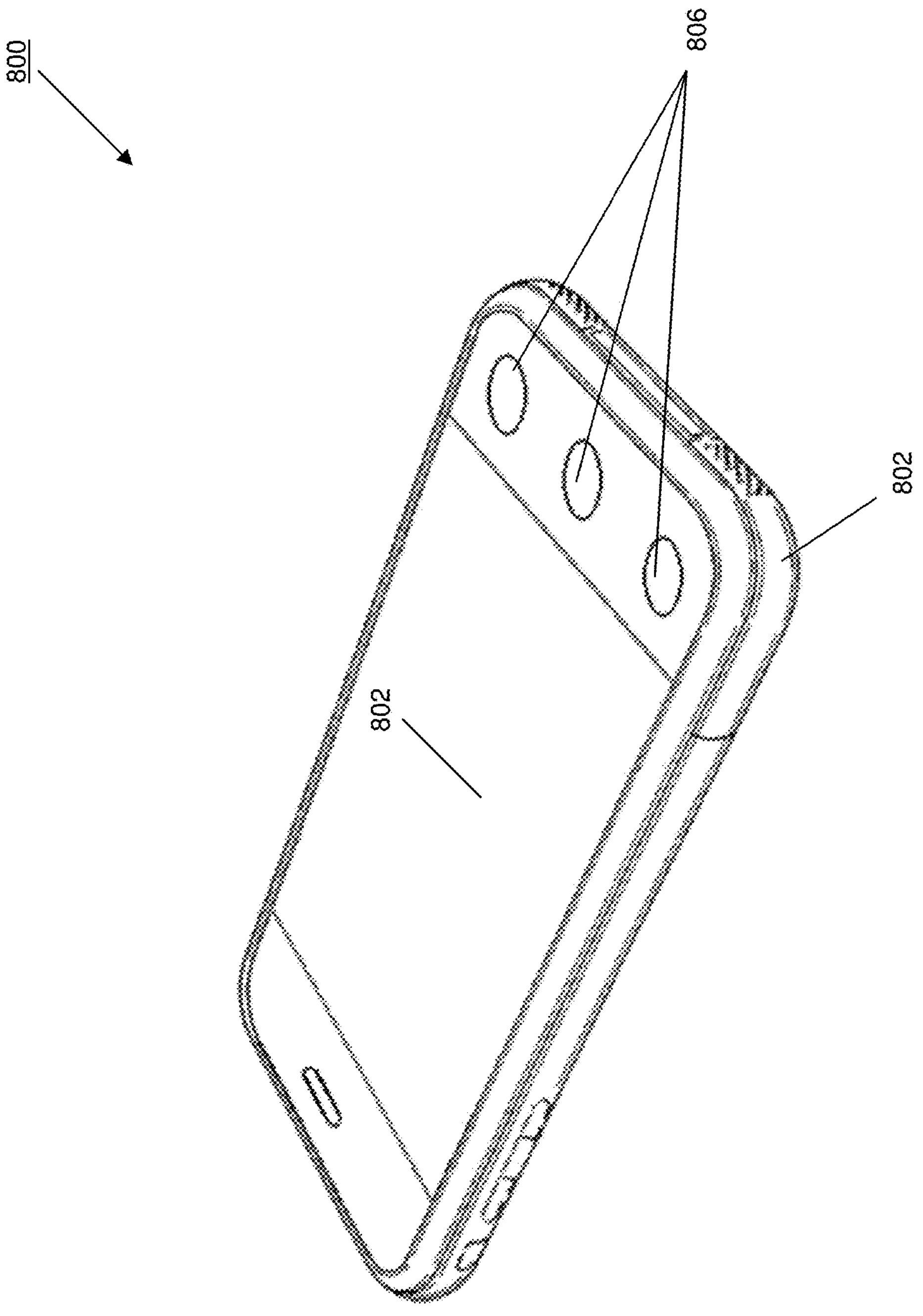
FIG. 8 is a perspective view illustrating an embodiment of a user device.

Referring now to FIG. 8, an embodiment of a user device 800 is illustrated. The device 800 may be any of the user devices discussed above. The device 800 includes a chassis 802 having a display 804 and an input device including the display 804 and a plurality of input buttons 806. One of skill in the art will recognize that the device 800 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 9:
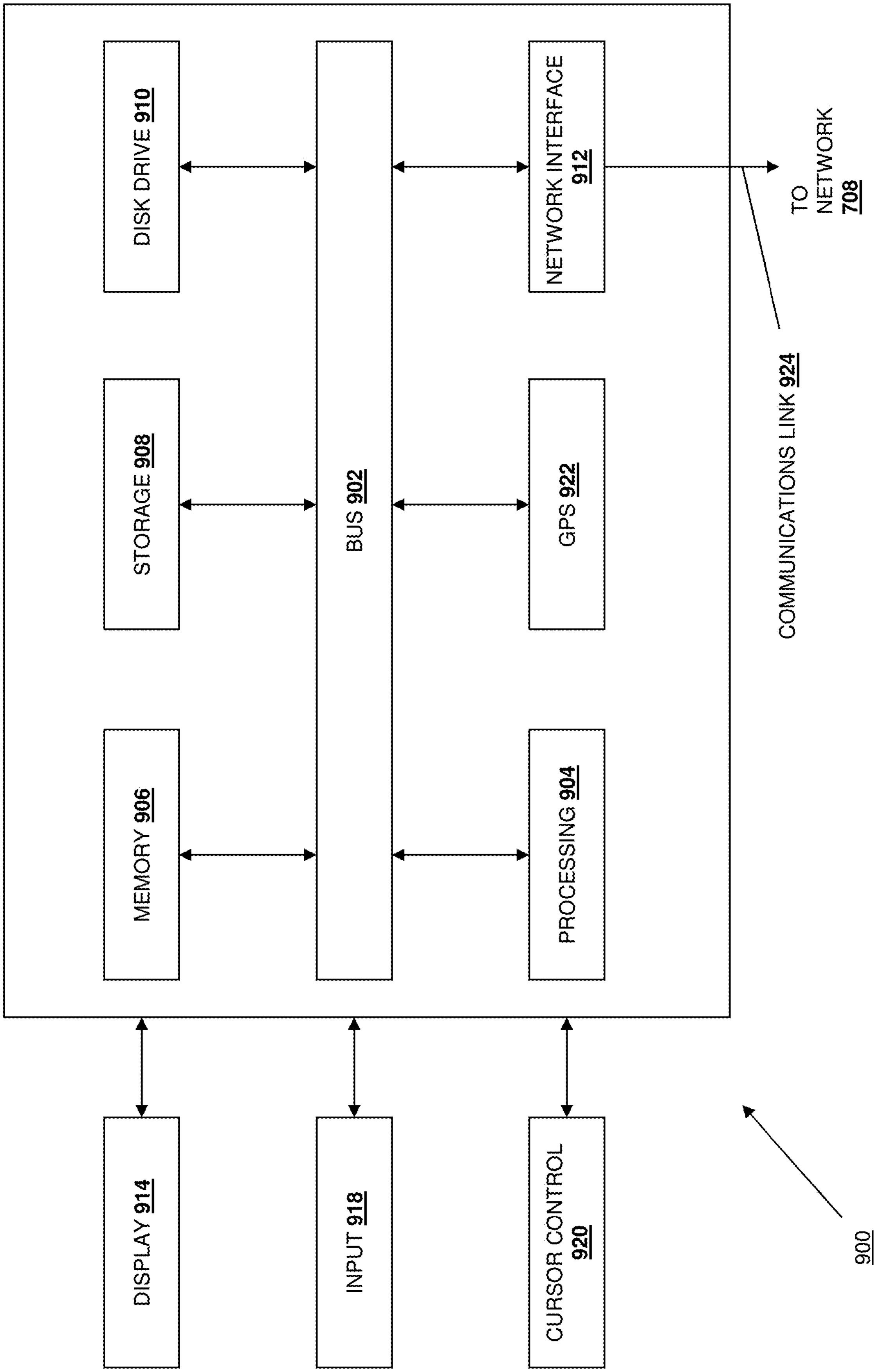
FIG. 9 is a schematic view illustrating an embodiment of a computer system.

Referring now to FIG. 9, an embodiment of a computer system 900 suitable for implementing, for example, the user devices, public ledger devices, and/or system provider devices, is illustrated. It should be appreciated that other devices utilized in the public ledger authentication system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art). In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the payer devices, payee devices, user devices, payment service provider devices, and/or system provider devices. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902.

In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for transferring virtual currency between wallets, comprising:

receiving a transaction request for a transaction between two accounts for a certain amount;

accessing, based on the certain amount of the transaction, a first wallet and two or more secondary wallets of a first account of the two accounts and associated with virtual currency, wherein the first wallet includes a first wallet private key, wherein the two or more secondary wallets each include a respective secondary wallet private key of secondary wallet private keys;

determining, based on the transaction request, to transfer the certain amount of the virtual currency to a second wallet of a second account of the two accounts via the two or more secondary wallets, wherein each of the two or more secondary wallets are each associated with different predefined amounts of the virtual currency;

identifying, in response to said determining to transfer the certain amount to the second wallet, a subset of secondary wallet private keys that are associated with the two or more secondary wallets, wherein said identifying the subset of secondary wallet private keys comprises:

determining at least a first subset of secondary wallet private keys for a first denomination and a second subset of secondary wallet private keys for a second denomination based on the different predefined amounts of the virtual currency associated with each of the two or more secondary wallets, wherein the first subset and the second subset have a combined value totaling at least the certain amount, and combining the first subset and the second subset of the secondary wallet private keys, causing to be transmitted, to the second wallet, the subset of the secondary wallet private keys; and enabling a private key disablement functionality that disables copies of the secondary wallet private keys that have been combined for the certain amount from being used to sign further transactions that transfer the virtual currency from the two or more secondary wallets.

2. The method of claim 1, wherein said accessing the first wallet comprises identifying the first wallet that is associated with a first user of a first user device, wherein the first wallet is further associated with a virtual currency.

3. The method of claim 1, further comprising:

selecting, based on the certain amount of the transaction, a combination of two or more of a plurality of first user secondary wallets that are associated with the first user.

4. The method of claim 1, wherein said determining to transfer the certain amount of the virtual currency to the second wallet of the second account via the two or more secondary wallets comprises associating the two or more secondary wallets with the different predefined amounts of the virtual currency.

5. The method of claim 1, wherein the two or more secondary wallets are implemented as shadow wallets that are inaccessible to a user associated with the first account.

6. The method of claim 1, wherein said causing the subset of the secondary wallet private keys to be transmitted to the second wallet comprises causing the subset of the secondary wallet private keys to be transferred to the second wallet stored on a server that hosts the first wallet.

7. The method of claim 1, wherein said causing the subset of the secondary wallet private keys to be transmitted to the second wallet comprises causing the subset of the secondary wallet private keys to be transferred to the second wallet that is stored on a second user device associated with a second user who associated with the second account.

8. The method of claim 1, further comprising:

determining that the virtual currency has been associated with the first wallet, and in response, automatically performing respective virtual currency transactions associated with the first account to transfer the association of predefined amounts of the virtual currency from the first wallet to each of the two or more secondary wallets.

9. The method of claim 1, further comprising:

determining, in response to determining to transfer the certain amount to the second wallet, an exchange rate between the virtual currency and a physical currency, wherein the subset of the secondary wallet private keys is selected based on the exchange rate.

10. A virtual currency transaction system, comprising:

a non-transitory memory storing instructions; and one or more hardware processors coupled to the non-transitory memory and configured to execute the instructions to cause the system to:

access, based on a transaction between two accounts for a certain amount, a first wallet of a first account of the two accounts and associated with virtual currency, wherein the first wallet includes a first wallet private key, determine, based on the transaction, to transfer the certain amount of the virtual currency to a second wallet of a second account of the two accounts via two or more secondary wallets, wherein each of the two or more secondary wallets are each associated with different predefined amounts of the virtual currency, wherein the two or more secondary wallets each include a respective secondary wallet private key of secondary wallet private keys;

transmit, to the second wallet, a subset of the secondary wallet private keys that are associated with the two or more of the secondary wallets, wherein the subset of secondary wallet private keys comprises at least a first subset of secondary wallet private keys for a first denomination and a second subset of secondary wallet private keys for a second denomination based on the different predefined amounts of the virtual currency associated with each of the two or more secondary wallets, wherein the first subset and the second subset have a combined value totaling at least the certain amount;

combine the first subset and the second subset of the secondary wallet private keys; and enable a private key disablement functionality that disables copies of the secondary wallet private keys that have been combined for the certain amount from being used to sign further transactions that transfer the virtual currency from the two or more of the secondary wallets.

11. The system of claim 10, wherein executing the instructions further causes the system to:

create the two or more secondary wallets using a certain distribution of an amount of virtual currency of the first wallet, wherein the two or more secondary wallets are implemented as respective shadow secondary wallets that are inaccessible to a first user associated with the first account.

12. The system of claim 11, wherein said wherein said accessing the first wallet comprises identifying the first wallet that is associated with a first user of a first user device, wherein the first wallet is further associated with a virtual currency.

13. The system of claim 10, wherein said causing the subset of the secondary wallet private keys to be transmitted to the second wallet comprises causing the subset of the secondary wallet private keys to be transferred to the second wallet stored on a server that hosts the first wallet.

14. The system of claim 10, wherein executing the instructions further causes the system to:

select, based on the certain amount of the transaction, a combination of two or more of a plurality of first user secondary wallets that are associated with the first user.

15. The system of claim 10, wherein said causing the subset of the secondary wallet private keys to be transmitted to the second wallet comprises causing the subset of the secondary wallet private keys to be transferred to the second wallet stored on a server that hosts the first wallet or on a second user device associated with a second user who associated with the second account.

16. The system of claim 10, wherein executing the instructions further causes the system to determine, in response to determining to transfer the certain amount to the second wallet, an exchange rate between the virtual currency and a physical currency, wherein the subset of the secondary wallet private keys is selected based on the exchange rate.

17. A non-transitory machine-readable medium having stored thereon machine-readable instructions executable to cause a machine to perform operations comprising:

accessing, based on a transaction that indicates a payment amount between two accounts, a first wallet of a first account of the two accounts and associated with virtual currency, wherein the first wallet includes a first wallet private key, determining, based on the transaction, to transfer the payment amount of the virtual currency to a second wallet of a second account of the two accounts via two or more secondary wallets, wherein each of the two or more secondary wallets are each associated with different predefined amounts of the virtual currency, wherein the two or more secondary wallets each include a respective one of secondary wallet private keys;

transmitting, to the second wallet, a subset of the secondary wallet private keys that are associated with the two or more secondary wallets, wherein the subset of secondary wallet private keys comprises at least a first subset of secondary wallet private keys for a first denomination and a second subset of secondary wallet private keys for a second denomination based on the different predefined amounts of the virtual currency associated with each of the two or more secondary wallets, wherein the first subset and the second subset have a combined value totaling at least the payment amount;

combining the first subset and the second subset of the secondary wallet private keys; and enabling a private key disablement functionality that disables copies of the secondary wallet private keys that have been combined for the payment amount from being used to sign further transactions that transfer the virtual currency from the two or more secondary wallets.

18. The non-transitory machine-readable medium of claim 17, wherein the operations further comprise:

creating the two or more secondary wallets using a certain distribution of an amount of virtual currency of the first wallet, wherein the two or more secondary wallets are implemented as respective shadow secondary wallets that are inaccessible to a first user associated with the first account.

19. The non-transitory machine-readable medium of claim 17, wherein said accessing the first wallet comprises identifying the first wallet that is associated with a first user of a first user device, wherein the first wallet is further associated with a virtual currency.

20. The non-transitory machine-readable medium of claim 17, wherein said causing the subset of the secondary wallet private keys to be transmitted to the second wallet comprises causing the subset of the secondary wallet private keys to be transferred to the second wallet stored on a server that hosts the first wallet or on a second user device associated with a second user who associated with the second account.

* * * * *